United States Patent
Tomasi et al.

(10) Patent No.: US 9,783,283 B2
(45) Date of Patent: Oct. 10, 2017

(54) FUSELAGE EQUIPMENT FORMING AN ACCESS DOOR AND COMPRISING A DISCHARGE CONTROL VALVE FOR PRESSURIZATION AIR

(71) Applicants: Airbus Operations (SAS), Toulouse (FR); Airbus (SAS), Blagnac (FR)

(72) Inventors: Marc Tomasi, Toulouse (FR); Patrick Lieven, Fronton (FR); Romain Delahaye, Colomiers (FR); Matthieu De Kergommeaux, Toulouse (FR); Laurent Lache, Plaisance du Touch (FR); Didier Poirier, Blagnac (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 0 days.

(21) Appl. No.: 14/722,967

(22) Filed: May 27, 2015

(65) Prior Publication Data

US 2015/0344123 A1 Dec. 3, 2015

(30) Foreign Application Priority Data

May 28, 2014 (FR) ..................................... 14 54818

(51) Int. Cl.
*B64C 1/14* (2006.01)
*B64D 13/02* (2006.01)

(52) U.S. Cl.
CPC .......... *B64C 1/1461* (2013.01); *B64C 1/1446* (2013.01); *B64D 13/02* (2013.01)

(58) Field of Classification Search
CPC ...... B64C 1/1461; B64C 1/1446; B64D 13/02

USPC ....................................................... 244/129.5
See application file for complete search history.

(56) References Cited

U.S. PATENT DOCUMENTS

| | | | | |
|---|---|---|---|---|
| 3,486,721 A | * | 12/1969 | Myczinski | B64C 25/16 239/265.29 |
| 3,544,045 A | * | 12/1970 | Butscher | B64D 13/02 244/129.1 |
| 3,740,006 A | * | 6/1973 | Maher | B64D 13/02 244/1 N |
| 4,960,249 A | * | 10/1990 | Signoret | B64D 13/02 244/118.5 |
| 5,337,977 A | | 8/1994 | Fleming et al. | |
| 6,273,136 B1 | * | 8/2001 | Steinert | B64D 13/02 137/601.08 |

(Continued)

FOREIGN PATENT DOCUMENTS

| | | |
|---|---|---|
| EP | 2428446 | 3/2012 |
| FR | 2926534 | 7/2009 |

OTHER PUBLICATIONS

French Search Report, Jan. 22, 2015.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

In order to limit the number of openings in an aircraft fuselage and to reduce the mass thereof, the invention makes provision for an item of aircraft fuselage equipment which is intended to be mounted in an opening of the fuselage, the item of equipment being configured to block/release an access passage which affords access to the inner side of the aircraft and which also comprises a discharge control valve for pressurization air.

14 Claims, 6 Drawing Sheets

(56) References Cited

U.S. PATENT DOCUMENTS

| | | | | |
|---|---|---|---|---|
| 7,198,062 B2* | 4/2007 | Hoffman | ................ | B60H 1/248 |
| | | | | 137/601.09 |
| 8,376,818 B2* | 2/2013 | Horner | ................... | B64D 13/02 |
| | | | | 244/129.5 |
| 2010/0001127 A1* | 1/2010 | Petrac | .................... | B64D 13/04 |
| | | | | 244/1 R |
| 2010/0096503 A1* | 4/2010 | Tanner | ................... | B64D 13/02 |
| | | | | 244/129.4 |
| 2010/0216385 A1* | 8/2010 | Heuer | ................... | B64D 13/02 |
| | | | | 454/71 |
| 2010/0294887 A1 | 11/2010 | Depeige | | |
| 2011/0049299 A1 | 3/2011 | Gowing et al. | | |
| 2012/0064813 A1 | 3/2012 | Horner et al. | | |

* cited by examiner

FUSELAGE EQUIPMENT FORMING AN ACCESS DOOR AND COMPRISING A DISCHARGE CONTROL VALVE FOR PRESSURIZATION AIR

CROSS-REFERENCES TO RELATED APPLICATIONS

This application claims the benefit of the French patent application No. 1454818 filed on May 28, 2014, the entire disclosures of which are incorporated herein by way of reference.

BACKGROUND OF THE INVENTION

The invention relates to the field of aircraft fuselages. More specifically, it relates to items of fuselage equipment, and in particular access doors and valves for controlling pressurization.

In a known manner, an aircraft fuselage comprises one or more access hatches or doors which allow an operator, when this hatch/door is open, to enter the inside of the aircraft. It is, for example, an access door to an electronics bay (or "E Bay") which is generally located in the lower portion of the fuselage. When it is open, this door leaves space for an access passage formed through the fuselage. This is because the standardized dimensions of this type of passage allow an operator to pass through, in order to reach the relevant compartment of the aircraft, from the outer side thereof. The presence of the access passage, also known as a "man hole," requires a local reinforcement of the fuselage around this passage. This structural reinforcement is carried out by a thickening of the skin of the fuselage around the hole, and also using, for example, frames, side members, etcetera.

Furthermore, the fuselage is also provided with one or more pressurization control valves. This valve is intended to allow control of the quantity of air which is discharged from a pressurized compartment of the aircraft, so that the pressure within this compartment is maintained at a safe level, and it remains comfortable for the passengers and the crew. Generally, it is the cabin pressure controllers ("CPC") which automatically control the quantity of air which is discharged via the dedicated valve. In this instance, the control valve is also mounted fixedly in a hole of the fuselage. The fuselage therefore also has to be locally reinforced, using structural means which are identical or similar to those described above, in relation to the fitting of the access door.

The presence of the above-mentioned holes, through the fuselage, is detrimental to the overall mass of the fuselage and therefore that of the aircraft. There is therefore a need for optimization of the configuration of such fuselages in order to reduce the overall mass.

SUMMARY OF THE INVENTION

The invention therefore proposes an item of equipment which is received in a single fuselage opening, in order to act as an access door and as a discharge control valve for pressurization air. Compared with known solutions of the prior art, only one opening is required through the fuselage in place of two. This involves only a single opening having to be reinforced structurally, which reduces the overall mass of the fuselage.

The invention preferably comprises at least one of the following optional features, taken in isolation or in combination.

Preferably, the discharge control valve comprises two flaps which are articulated about two parallel rotation axes, respectively, the valve being configured to allow control of the discharge of the pressurization air by means of pivoting of the two flaps about the two rotation axes which remain fixed relative to the body of the item of equipment, the item of equipment also comprising the flaps in order to move them towards their access position, these movement means being configured so as to allow the two rotation axes to be moved apart when the flaps are moved towards their access position.

Preferably, the item of equipment comprises means for locking the flaps in a control position.

The discharge control valve preferably comprises two movable flaps which define between them an opening which allows the discharge of pressurization air to be controlled. Alternatively, it may involve a single movable element, for example, of the flap type.

The invention also relates to an aircraft fuselage which comprises at least one item of equipment as described above, mounted in an opening of the fuselage.

The invention also relates to an aircraft which comprises such a fuselage, the item of equipment being mounted on a portion of the fuselage which delimits an electronics bay. Nonetheless, the equipment could be mounted on other portions of the fuselage, without departing from the scope of the invention.

The aircraft comprises means for controlling the discharge control valve for pressurization air, these means preferably being electrical control means.

Finally, the above-mentioned means for moving the flaps into their access position and/or the above-mentioned means for locking the flaps in a control position have electrical control means, these control means preferably being located in the cockpit of the aircraft.

BRIEF DESCRIPTION OF THE DRAWINGS

Other advantages and features of the invention will be appreciated from the non-limiting detailed description below.

This description will be set out with reference to the appended drawings, in which.

DETAILED DESCRIPTION OF THE PREFERRED EMBODIMENTS

Figure 1:
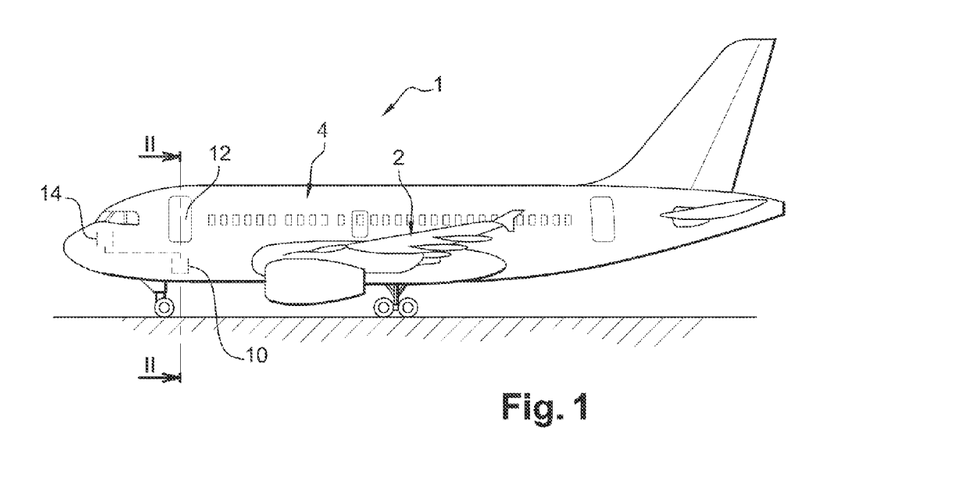
FIG. 1 is a side view of an aircraft comprising a fuselage on which an item of equipment according to the invention is mounted.
Figure 2:
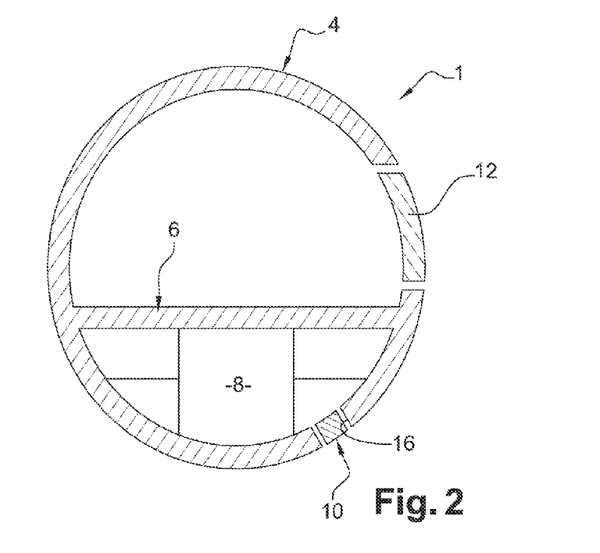
FIG. 2 is a schematic cross section of the fuselage shown in the preceding Figure, the plane of section II-II designated in FIG. 1 passing through the equipment.

With reference first to FIGS. 1 and 2, an aircraft 1 is illustrated which comprises a wing 2 and a fuselage 4. Preferably, it is a conventional transport airplane in the sense conventionally used by constructors in the field of aeronautics. Inside the fuselage 4, there is defined a space which is divided into two portions by a floor 6 which is arranged horizontally. The upper space is generally dedicated to the fitting of the cockpit in the front portion of the aircraft and the passenger cabin at the rear portion. The lower space is dedicated to the transport of goods and/or passenger baggage.

At the front of this compartment for transport of goods/baggage, there is generally provided a compartment which is referred to as an electronics bay 8, in which there are installed a number of systems which are required for the correct operation of the aircraft. Therefore, there is generally provided an access door to this bay 8 below the level of the floor 6, in order for one to be able to enter beneath this same bay and to carry out the operations required.

Furthermore, in addition to the possibility of access from the inner side of the aircraft to this bay 8, there is provided an item of equipment 10 which is mounted on the fuselage and which allows access to this bay 8 from the outer side of the aircraft. To this end, the equipment 10 specific to the present invention is arranged in the lower portion of the fuselage.

As will be described in detail below, one of the specific features of the invention is that this equipment 10 not only acts as an access door to the electronics bay 8, but also involves a discharge control valve for pressurization air.

This valve is intended to perform the conventional function thereof of controlling the quantity of air which is discharged via the pressurized bay 8 so that the pressure within this bay and within all of the pressurized compartments of the aircraft is maintained at a safe level and so that it remains comfortable for the passengers and the crew.

The control is carried out in an automatic manner by means of one or more cabin pressure controllers 14 which are electrical control means which are known per se and which are illustrated schematically in FIG. 1.

FIGS. 3 to 5b show a first embodiment which is not covered by the invention and in which the equipment 10 is an access door which is intended to be mounted in a fuselage opening 16 which is illustrated in FIG. 2. In this instance, it is an access door 10 which is articulated to the fuselage using hinges 33. Depending on whether this door 10 is in an open or closed position, it is therefore capable of releasing or blocking the opening 16. Alternatively, it could be a movable hatch which is mounted in the opening 16, without departing from the scope of the invention.

Figure 3:
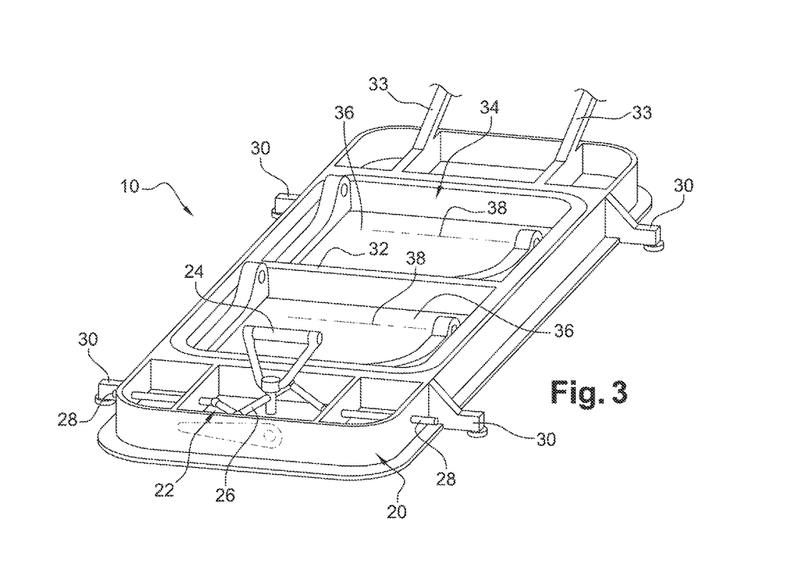
FIG. 3 is a perspective view of an item of equipment according to a first embodiment which is not covered by the invention but whose description will be given by way of information.

The opening 16, when it is released by the opening of the access door 10, forms an access passage which affords access to the inner side of the aircraft from the outer side thereof. This access passage naturally complies with the standards in force, and thus has dimensions which are sufficient to allow the passage of an operator who wishes to enter the electronics bay 8. By way of indication, this type of passage 16 is generally of rectangular or square form.

In this first embodiment, the equipment 10 is therefore intended to block the access passage 16 when it is mounted on the fuselage 4 using hinges 33 and held in a closed position. It is also intended to release this same access passage 16 when it is moved into the open position by means of pivoting about hinges 33, this pivoting preferably being carried out in a manual manner by an operator.

The equipment 10 comprises a body 20 which defines the contour of the door and on which there is mounted a device 22 for locking the door to the fuselage 4, in the access passage 16, this device 22 being manually controlled.

The locking device 22 has a conventional shape known to the person skilled in the art. It is, for example, a handle 24 which forms the manual control and which is connected to a linkage 26 which controls locking members 28 which protrude towards the outer side of the body 20. These locking members 28 are intended to be introduced into corresponding holes formed in the fuselage 4, in the region of the contour of the access passage 16. Alternatively, the control of the locking members 28 could be electrical, without departing from the scope of the invention.

In this first embodiment, the manual actuation of the handle 24 by an operator, from inside the aircraft, allows the locking members 28 to be retracted or deployed depending on whether he wishes to lock or unlock the device 22. After manual unlocking via the handle 24, it is thus possible to pivot all of the equipment 10 from the closed position to the open position as a result of the hinges 33 in order to leave space for the access passage 16 through the fuselage 4. By way of indication, for the movement from the closed position to the open position thereof, the equipment 10 is pivoted towards the inner side of the electronics bay 8.

Figure 4:
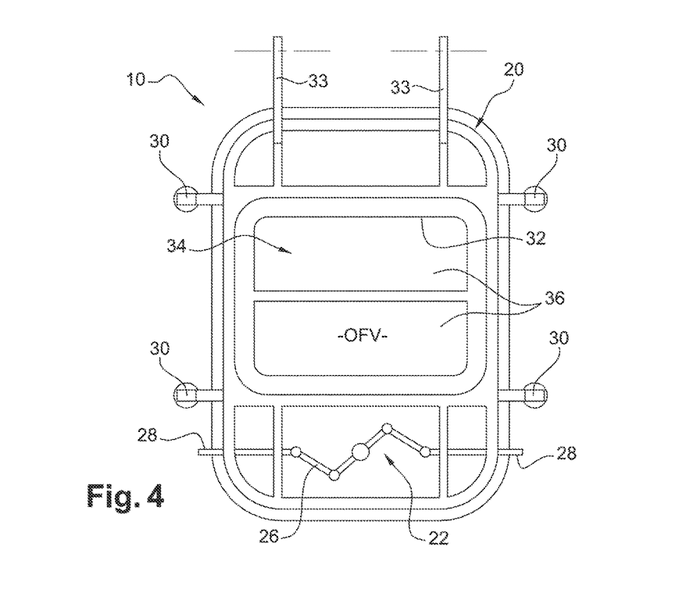
FIG. 4 is a bottom view of the equipment shown in FIG. 3.

Furthermore, the body 20 is provided with abutment means 30 which protrude towards the outer side and which are intended to allow the equipment to be supported on the inner side of the fuselage when the equipment occupies the closed position thereof, as illustrated in FIGS. 2 to 4. By way of indication, these abutment means may be in the form of four support locations 30 which are arranged substantially close to the four rounded corners of the body 20 of the equipment.

There is formed in the equipment body 20 a through-opening 32 in which the discharge control valve 34 for pressurization air is mounted. Therefore, when the equipment 10 which forms an access door is pivoted relative to the fuselage 4 in order to release the access passage 16, this pivoting relates not only to the body 20 of the equipment, but also to the valve 34 which is mounted on the same body.

Consequently, the invention is advantageous in that it requires only a single opening 16 through the fuselage for the performance of the two functions, that is to say, the access door to the electronics bay 8 and the discharge control valve 34. This affords advantages in terms of mass since only a single fuselage opening needs to be structurally reinforced, close to the periphery thereof. Furthermore, this also allows the aerodynamic performance levels to be improved since, by providing a single fuselage opening in place of two, a potential source of drag which is linked with a potential misalignment between the skin of the fuselage and the outer surface of the equipment 10 mounted thereon is eliminated. As a result of this omission of one fuselage opening compared with the solutions of the prior art, the invention also affords an advantage in terms of ease of production.

Figure 5A:
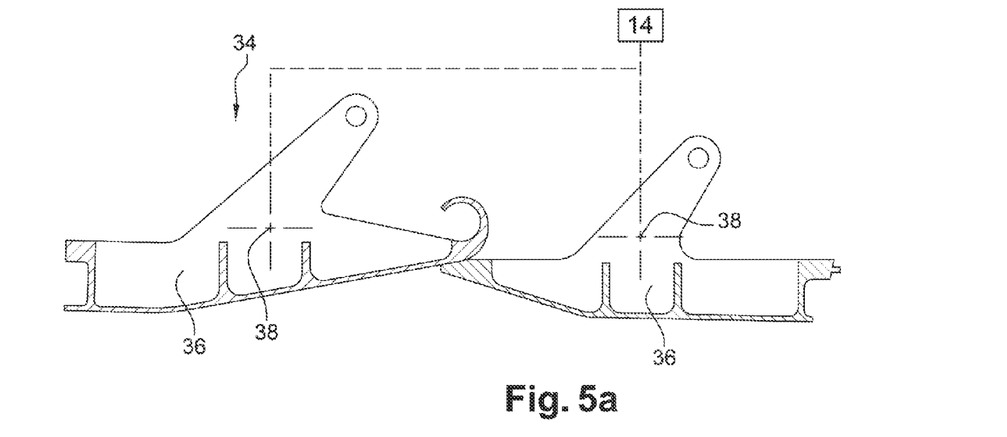
FIGS. 5a and 5b schematically show the operation of a discharge control valve for pressurization air, mounted on the equipment shown in FIGS. 3 and 4.
Figure 5B:
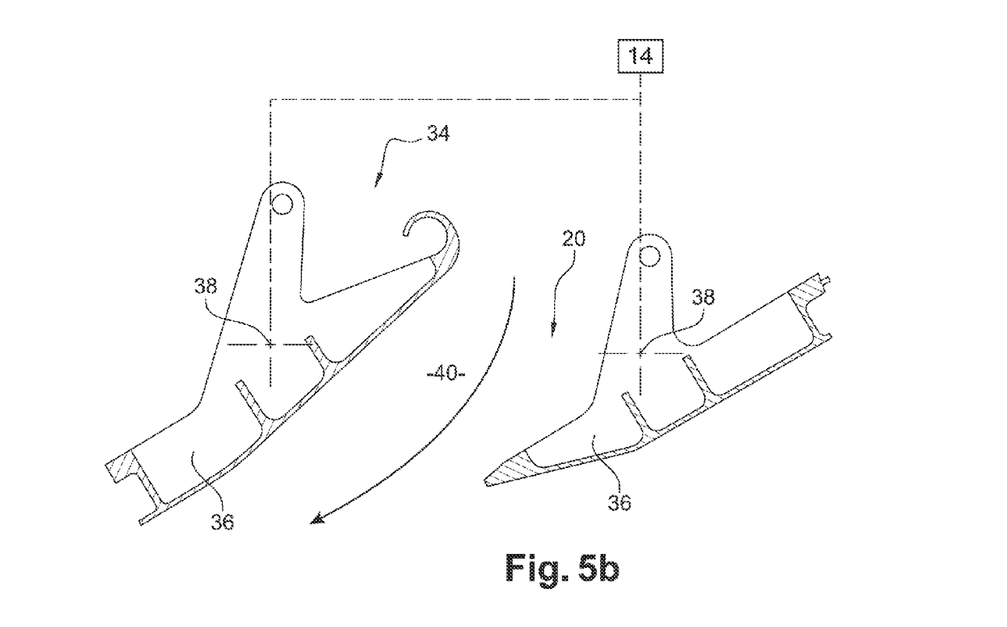

The discharge control valve 34 may be produced in any known manner by the person skilled in the art. In the example shown in FIGS. 3 to 5b, the configuration considered is of the type with two rotating flaps which are mounted so as to be articulated to the body 20 about parallel rotation axes 38, these axes preferably being parallel with the transverse direction of the aircraft. The two flaps 36 are positioned in an adjacent manner so that, in the closed position shown in FIG. 5a, their opposing ends overlap each other in order to prevent the discharge of air between the two flaps. However, when they are pivoted by the cabin pressure controllers 14 as shown in FIG. 5b, an opening 40 is defined between these two opposing ends of the flaps so as to allow air to be discharged. The extent of pivoting of the flaps 36 controls the passage cross-section of the opening 40 and thus allows the air pressure to be controlled inside the aircraft, as a result of the above-mentioned cabin pressure controllers.

In the first embodiment, the periphery of the body 20 is intended to incorporate sealing means in order to prevent leakages of air between this body and the access passage 16 provided through the fuselage 4. Conversely, these sealing means, of the lip seal type, could be provided on the access passage contour 16.

The locking device 22 is itself preferably arranged at an end of the body 20, while the control valve 34 is substantially centered on the same body.

Figure 6:
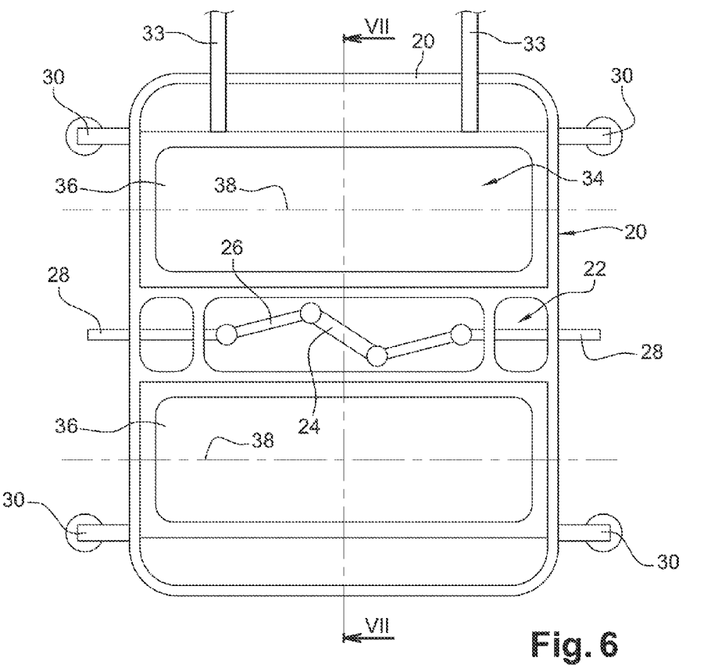
FIG. 6 is a view similar to that of FIG. 4, with the equipment in the form of a production alternative.
Figure 7:
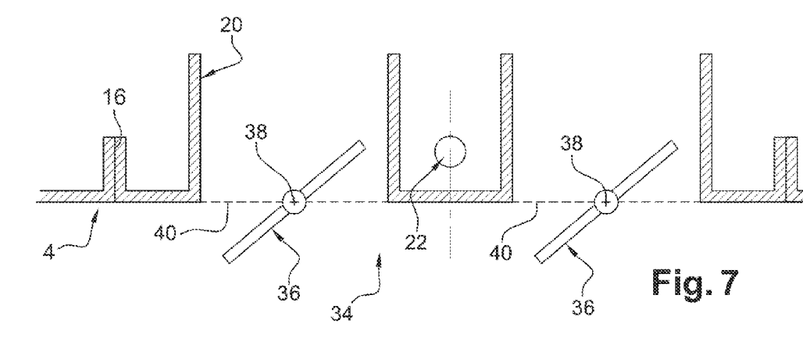
FIG. 7 is a sectioned view taken along the line VII-VII of FIG. 6.

In the alternative of the first embodiment illustrated in FIGS. 6 and 7, the two movable flaps 36 of the control valve 34 are separated by the locking device 22, which is substantially centered on the body 20. The control function is carried out via the two flaps 36 which each block a separate opening 40 through the body 20, but the operation of these two flaps 36 is preferably not dissociated. For example, with a return mechanism, it is possible to retain a single motorization unit for controlling the two flaps 36.

In this instance, each flap is therefore in the form of a butterfly valve which, in accordance with the rotation thereof, releases an opening 40 which is formed through the body 20.

Figure 8:
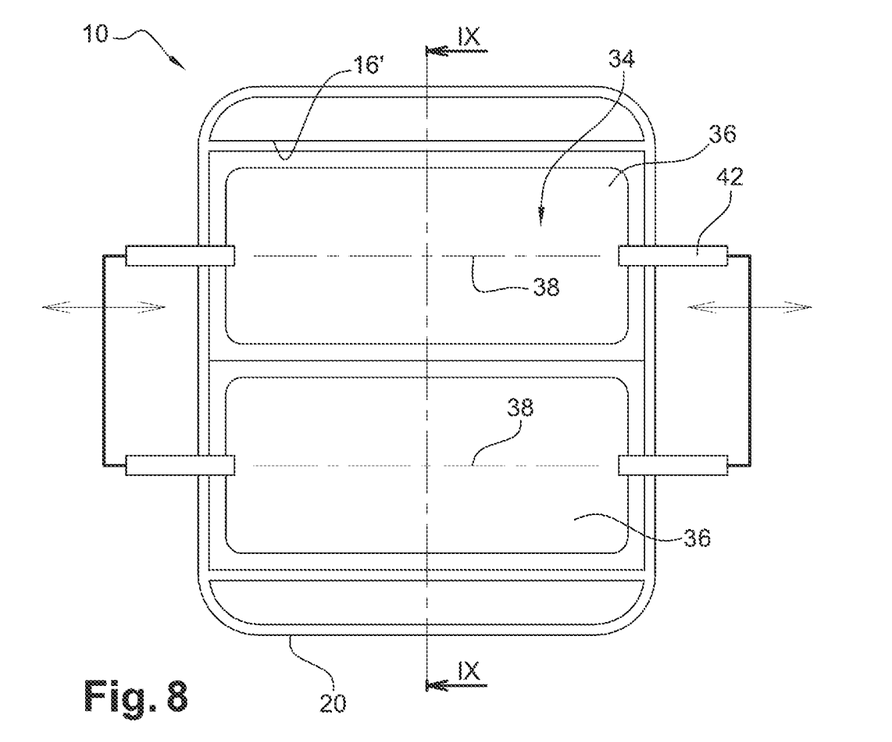
FIG. 8 is a view similar to that of FIG. 4, with the equipment in the form of a second preferred embodiment of the invention.
Figure 9A:
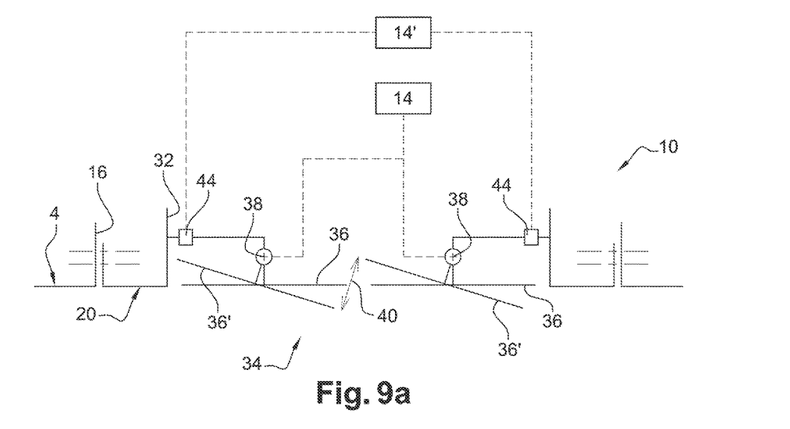
FIGS. 9a and 9b are sectioned views taken along the line IX-IX of FIG. 8, with the equipment being in different configurations.
Figure 9B:
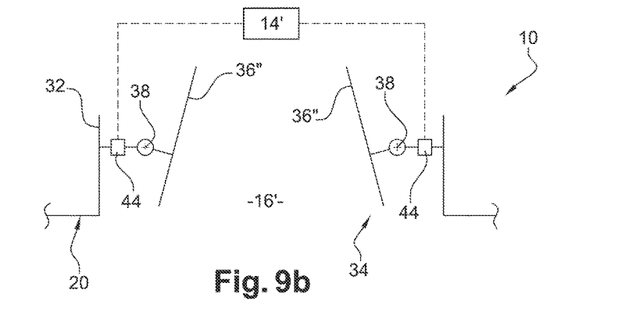

With reference to FIGS. 8 to 9b, an item of equipment 10 is shown in accordance with a second embodiment covered by the invention. This item of equipment contrasts with those described above in that the body 20 thereof is intended to be mounted fixedly in the fuselage opening 16, and is not intended to be articulated thereto. That is to say, it is no longer an access door, as was the case for the solutions described above, but an item of equipment 10 which is intended to remain permanently on the fuselage 4, in the opening 16 thereof. Fixing means of the rivet or bolt type are therefore provided for the assembly of the body 2 in the opening 16.

The control valve 34 is also mounted on the body 20, with the two flaps 36 thereof articulated about the axes 38, as shown in FIG. 8 and in FIG. 9a in the closure position. In this position, the flaps 36 block an opening 32 which is produced through the body 20 so that the pressurization air cannot be discharged from the electronics bay.

When these flaps 36 are pivoted about their axes 38 by the cabin pressure controllers 14, as indicated by the elements 36' in FIG. 9a, they define between them the opening 40 which allows the discharge of air under pressure. The quantity of air extracted is dependent on the extent of the opening of the opening cross section 40.

The specific nature of this second embodiment involves the fact that the flaps 36 may be moved into a position which is referred to as the "access" position and which is indicated by the elements 36" in FIG. 9b. In this position, the flaps 36" are substantially vertical and release an access passage 16' which affords access to the electronics bay of the aircraft. With the flaps 36" spaced apart to the maximum extent in this access position, the access passage 16' released thereby corresponds to a large portion of the opening 32 which is formed through the body 20 and in which the valve 34 is mounted.

The movement from the closed position of the flaps 36 illustrated in FIG. 9a to the access position 36" thereof shown in FIG. 9b is preferably carried out using movement means 44. In order to be able to move the flaps 36 as close as possible to the contour of the opening 32 in the access position 36", the means 44 are configured to apply to each flap 36, relative to the body 20, a movement which is different from a simple rotation of the flap 36 relative to the body 20 about the axis 38 thereof. This movement is similar, for example, to a rotation whose axis which is parallel with the axis 38 is located on or close to the end of the flap which is arranged facing the contour of the opening 32.

Regardless of the configuration considered for the movement means 44, they are preferably configured to allow the two rotation axes 38 to be moved apart when the flaps 36 move from the closed position shown in FIG. 9a to their access position 36" shown in FIG. 9b. That is to say, the means 44 allow the rotation axes 38 to be moved relative to the body 20 of the item of equipment, while, in a configuration for simple control of discharge of pressurization air, these axes 38 remain fixed relative to the body 20.

As has been illustrated in FIG. 8, means 42 for locking the flaps 36 in a control position are preferably further provided. This is because these means 42, which are carried by the fuselage 4, allow the flaps 36 to be blocked in a position which permits them to pivot only about the axes 38 which therefore remain fixed relative to the body 20 of the equipment. Consequently, the flaps 36 cannot be displaced accidentally towards their access position which permits the passage of an operator.

These means 42 may, for example, be sliding bars which are capable of being inserted into their respective flaps 36, for example, at two opposing ends of each flap, along the axis 38. After the bars 42 have been withdrawn, the axes 38 of the flaps 36 are no longer blocked relative to the body 20 and these flaps may therefore be moved towards their access position 36" via the means 44 provided for this purpose.

Preferably, electrical control means 14' of the movement means 44 are provided in order to ensure the movement of the flaps into their access position 36" which affords the passage of an operator. These are preferably the same control means 14' which can preferably be actuated from the cockpit and which control the sliding of the bars 42 which bring about the locking of the flaps 36 in a control position and the unlocking thereof. In this regard, it is indicated that the control means 14, 14' can be arranged within the same control module.

In this second embodiment, an additional gain is achieved in terms of mass since the device for locking the equipment to the fuselage is no longer necessary.

It is also no longer necessary to ensure the control of the sealing between the periphery of the equipment 10 and the opening 16 through the fuselage, and in particular no longer necessary to use a lip seal as in the solutions shown in the previous Figures.

Of course, various modifications may be carried out by the person skilled in the art to the invention which has been described above, purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An item of aircraft fuselage equipment configured to be mounted in an opening of the fuselage and comprising:
   a configuration alternatively blocking and releasing an access passage affording access to an inner side of the aircraft, wherein the access passage comprises a man hole,
   a body configured to be fixedly mounted in the opening of the fuselage, a discharge control valve being mounted on the body and comprising two flaps articulated about two parallel rotation axes between a closed position and an access position releasing the access passage formed through the body of the equipment, and
   wherein the two rotation axes are moved apart from one another when the flaps are in their access position compared to when the flaps are in the closed position.

2. The item of equipment according to claim 1, further comprising:
   a flap controller configured to move the flaps between the access position and the closed position.

3. The item of equipment according to claim 2, further comprising means for locking the axes of the flaps so that the flaps cannot be moved apart from each other.

4. The item of equipment according to claim 3, wherein the means for locking the flaps comprise sliding bars which may be slid into engagement between the fuselage and the flaps.

5. An aircraft fuselage comprising:
   an opening in the fuselage;
   at least one item of equipment mounted in the opening of the fuselage and comprising:
   a configuration alternatively blocking and releasing an access passage affording access to an inner side of the aircraft,
   a discharge control valve for pressurization air, and
   a body configured to be fixedly mounted in the opening of the fuselage,
   the discharge control valve being mounted on the body and comprising two flaps configured to be moved into an access position releasing the access passage formed through the body of the equipment,
   wherein the two flaps are articulated about two parallel rotation axes, the discharge control valve being configured to allow control of the discharge of the pressurization air by pivoting the two flaps about the two rotation axes which remain fixed relative to the body of the equipment, and
   wherein the equipment also comprises a flap controller configured to move the flaps towards their access position, the controller being configured to cause the two rotation axes to be moved apart from one another when the flaps are moved towards their access position.

6. An aircraft comprising:
   a fuselage,
   an opening in the fuselage; and,
   at least one item of equipment mounted in the opening of the fuselage and comprising:
   a configuration alternatively blocking and releasing an access passage affording access to an inner side of the aircraft,
   a body configured to be fixedly mounted in the opening of the fuselage,
   a discharge control valve for pressurization air, the discharge control valve being mounted on the body and comprising at least two movable elements configured to be moved into an access position releasing the access passage formed through the body of the equipment, wherein each movable element is articulated a rotation axis, the discharge control valve being configured to allow control of the discharge of the pressurization air by pivoting the at least two moveable elements about its rotation axis which remain fixed relative to the body of the equipment, and,
   a controller configured to move each movable element towards its access position, the controller being configured to cause the rotation axes to be moved apart from one another when the movable elements are moved towards their access position.

7. The aircraft according to claim 6, further comprising cabin pressure controllers configured to control the discharge control valve for pressurization air.

8. The aircraft according to claim 5, wherein the controller includes an electrical control.

9. The aircraft fuselage according to claim 5, further comprising means for locking the flaps in a control position, the locking means including an electrical control.

10. The aircraft of claim 6 wherein the opening of the fuselage is in a portion of the fuselage which delimits an electronics bay.

11. The aircraft of claim 6 wherein the controller includes an electrical control.

12. The aircraft of claim 6 further comprising means for locking the flaps in a control position.

13. The aircraft of claim 12 wherein the locking means including an electrical control.

14. The item of equipment according to claim 1 wherein the flap controller includes an electrical control.

* * * * *